United States Patent
Zhang et al.

(10) Patent No.: US 6,446,351 B1
(45) Date of Patent: Sep. 10, 2002

(54) LINEAR MEASURING MACHINE

(75) Inventors: Yuwu Zhang; Masaoki Yamagata; Hiroyuki Tokito; Yoichi Nomura, all of Kawasaki; Bunji Aoyama, Kure, all of (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/547,102

(22) Filed: Apr. 11, 2000

(30) Foreign Application Priority Data

Apr. 13, 1999 (JP) .................................. 11-105084

(51) Int. Cl.$^7$ ................................................ G01B 5/00
(52) U.S. Cl. ............................. 33/832; 33/556; 33/559; 702/166
(58) Field of Search ..................... 33/832, 503, 504, 33/556, 558, 559, 561, 1 M; 702/155, 167, 168, 156, 158, 166

(56) References Cited

U.S. PATENT DOCUMENTS

| | | | | |
|---|---|---|---|---|
| 5,018,280 A | * | 5/1991 | Enderle et al. ............... 33/832 |
| 5,193,286 A | * | 3/1993 | Collier ........................ 33/551 |
| 5,222,034 A | * | 6/1993 | Shelton et al. ................ 33/503 |
| 6,163,973 A | * | 12/2000 | Matsumiya et al. .......... 33/503 |
| 6,333,969 B1 | * | 12/2001 | Matsumiya et al. ..... 340/686.5 |

OTHER PUBLICATIONS

"Height Measurement Standard Gage Improving Efficiency of Automation"; Nikkan Kogy Shimbun; Jan. 28, 1999.

\* cited by examiner

Primary Examiner—Diego Gutierrez
Assistant Examiner—Mirellys Jagan
(74) Attorney, Agent, or Firm—Oliff & Berridge, PLC

(57) ABSTRACT

A linear measuring machine is provided, the linear measuring machine having a base (11), a column (12) disposed on the base, a slider (14) elevatable along the column and an elevation driving mechanism (44) including a motor for lifting and lowering the slider. The linear measuring machine further includes a touch-and-back mechanism for driving the elevation driving mechanism in a direction for a probe (13) to move away from a measurement surface of the workpiece after fetching a detection value of a displacement sensor (45) when the probe touches the measurement surface of the workpiece and for stopping the elevation driving mechanism.

3 Claims, 5 Drawing Sheets

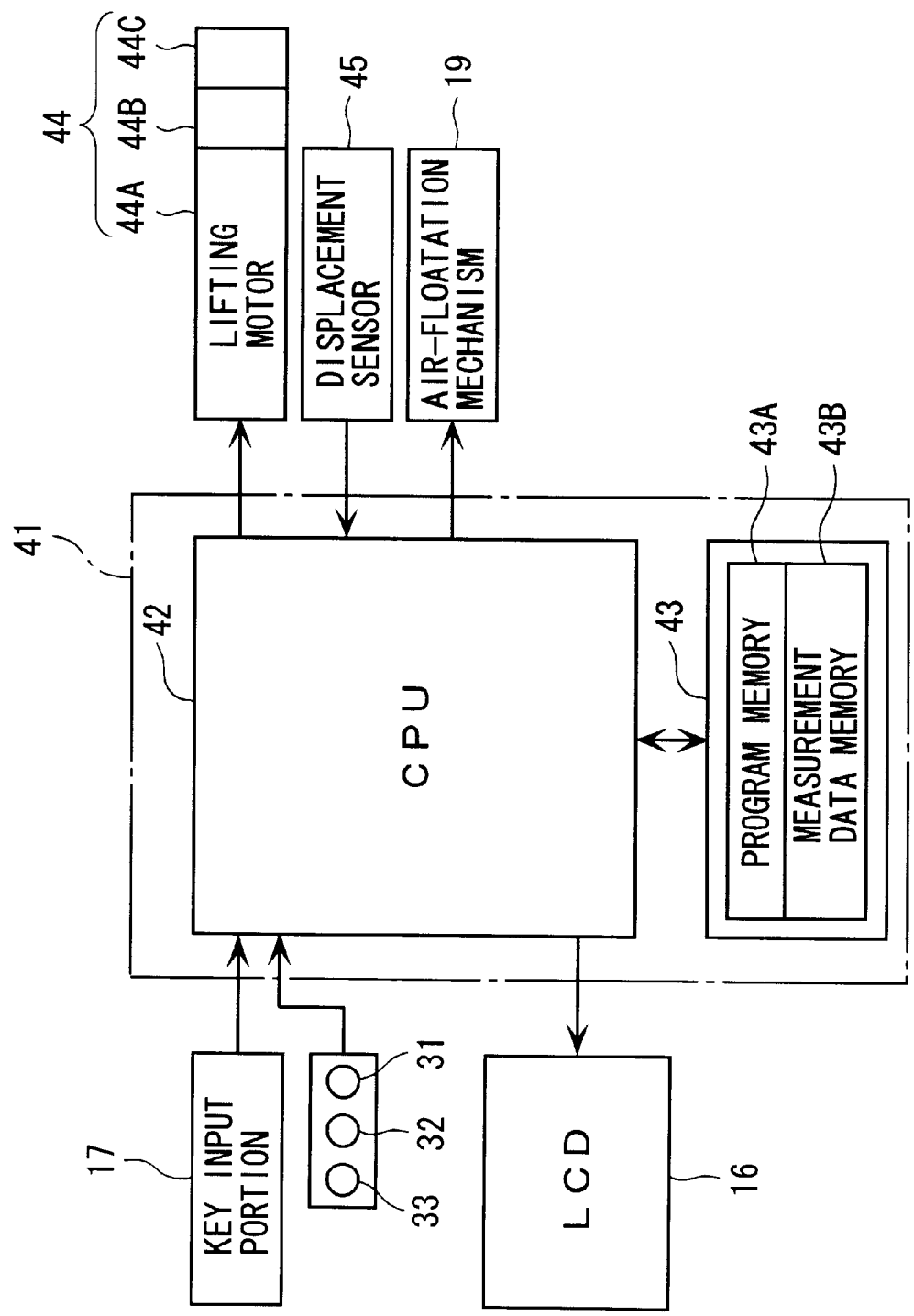

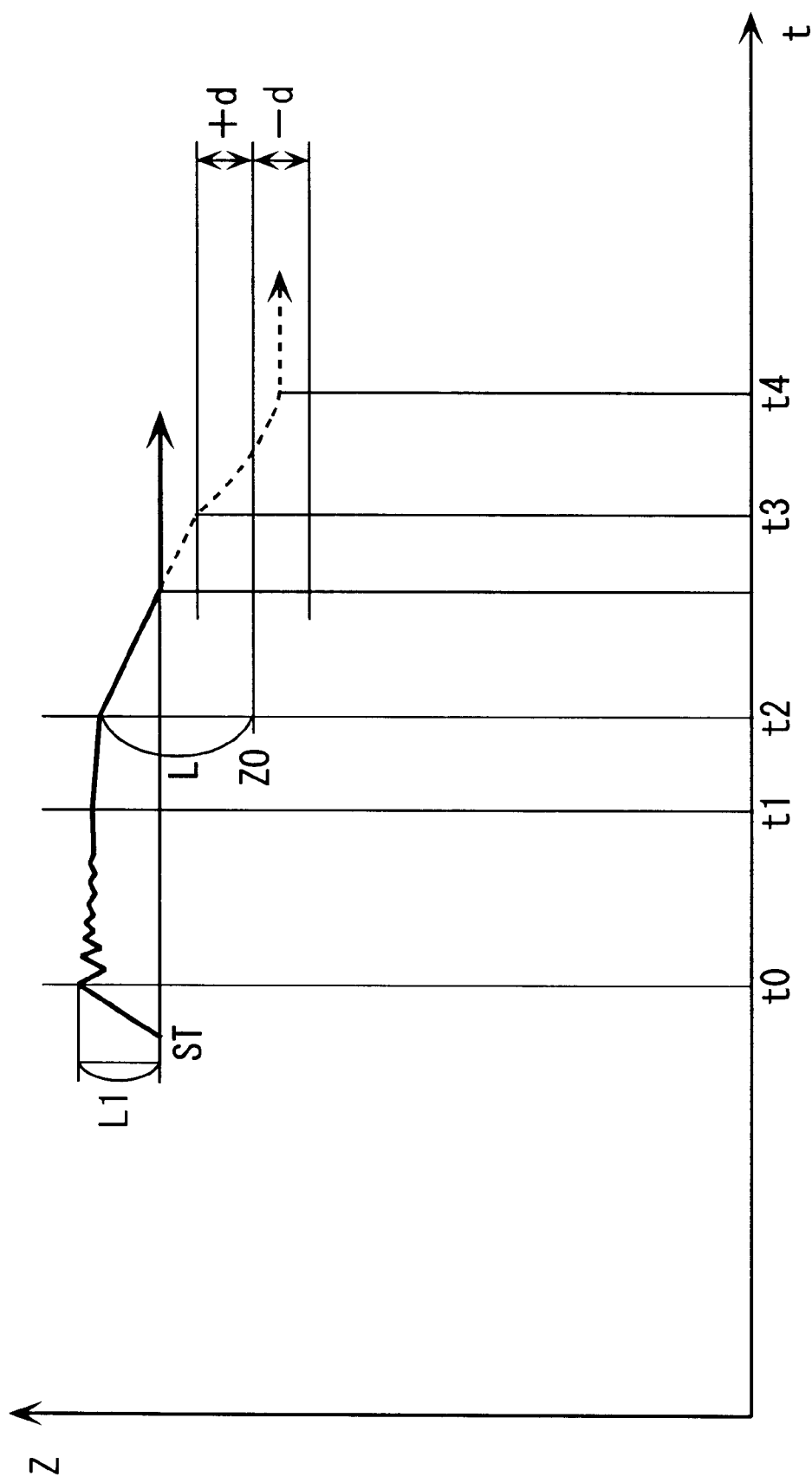

LINEAR MEASURING MACHINE

BACKGROUND OF THE INVENTION

1. Field of the Invention

The present invention relates to a linear measuring machine having a vertically elevatable probe to touch a target portion of a workpiece to measure a dimension of the workpiece such as height, step, hole and shaft.

2. Description of Related Art

For measuring a dimension of a workpiece such as height, step, hole and shaft is measured on a surface plate, a linear measuring machine having a vertically elevatable probe, so-called height gauge is used.

Among the height gauge, a motor-driven type height gauge has a base movable disposed on a surface plate, a column standing on the base, a slider elevatable along the column and having a probe, an elevation driving mechanism including a motor for elevating the slider, a displacement sensor for detecting a displacement amount of the slider in height direction, a display, and a controller for elevating the slider by driving the elevation driving mechanism based on a measurement command, for fetching a detection value of the displacement sensor when the probe touches the measurement surface of the workpiece, and for displaying the detection value on the display.

In the motor-driven type height gauge, when a certain measurement item is commanded for measurement, the controller raises or lowers the slider by driving the elevation driving mechanism. When the probe touches the measurement surface of the workpiece by lifting or lowering the slider and a fluctuation value of vertical position is below a predetermined level, the detection value of the displacement sensor is fetched, which is displayed on the display.

Accordingly, an operator can measure the height position of the measurement surface of the workpiece onto which the probe touches by the detection value (measurement value) displayed on the display.

Incidentally, since the probe keeps on touching the workpiece once the probe touches the workpiece, in order to conduct the next measurement, the operator moves the probe in a direction away from the workpiece (upward or downward) for a predetermined degree to draw out the probe from the workpiece before the next measurement.

If the measuring machine and/or the workpiece are moved immediately after measurement without the above operation, since the workpiece and the probe moves while keeping interference therebetween, i.e. the workpiece and the probe are in contact with each other during movement, the workpiece can be scarred or the probe may be damaged.

SUMMARY OF THE INVENTION

An object of the present invention is to provide a linear measuring machine capable of avoiding scar on the workpiece or damage on the probe even when the measuring machine and/or the workpiece are moved immediately after the measurement, i.e. to provide a linear measuring machine capable of improving measurement efficiency without causing damage to the workpiece and/or the probe.

For attaining the above object of the present invention, the linear measuring machine according to the present invention has following arrangement.

A linear measuring machine according to the present invention includes: a base movably disposed on a surface plate; a column provided on the base; an elevation driving mechanism including a motor for lifting and lowering the slider; a displacement sensor for detecting a displacement of the slider in a height direction; a controller for fetching a detection value of the displacement sensor when the probe touches a measurement surface of a workpiece; and a display for displaying the detection value fetched by the controller. The linear measuring machine is characterized in that the controller has a touch-and-back mechanism for moving the elevation driving mechanism in a direction away from the measurement surface of the workpiece after fetching the detection value of the displacement sensor when the probe touches the measurement surface of the workpiece and for stopping the slider, when the slider is lifted or lowered by driving the elevation driving mechanism.

In the above arrangement, the controller lifts or lowers the slider by driving the elevation driving mechanism when a measurement command is given. When the controller detects that the probe touches the measurement surface of the workpiece by lifting or lowering the slider, the controller drives the elevation driving mechanism in a direction for the probe to move away from the measurement surface of the workpiece after the detection value of the displacement sensor at that time is fetched. Accordingly, since the workpiece and the probe are separated in the above condition, the workpiece is not scarred or the probe is not damaged even when the measuring machine and/or the workpiece are moved immediately after the measurement. Accordingly, the measuring machine and the workpiece are not damaged and measurement efficiency can be improved.

In the above, the touch-and-back mechanism may preferably stop driving the elevation driving mechanism when the probe is retracted to reach a predetermined allowable stop area relative to a retraction target position remote from the measurement surface of the workpiece by a predetermined retraction amount.

According to the above arrangement, since the drive of the elevation driving mechanism is stopped when the probe is retracted to reach the predetermined allowable stop area relative to the retraction target position, the probe is stilled adjacent to the retraction target position by inertia. In short, the probe can be stilled at a position adjacent to the retraction target position.

In the above, the touch-and-back mechanism may preferably forcibly stop the slider when the probe keeps on retracting beyond the retraction target position and when a predetermined time passes after the probe is separated from the measurement surface of the workpiece.

Accordingly, since the slider is forcibly stopped after the predetermined time even when the probe keeps on retracting beyond the retraction target position, the probe and the workpiece are less likely to interfere with each other.

In the above, the retraction amount may preferably be set at will.

Accordingly, since the retraction amount can be set at will in accordance with the portion of the workpiece to be measured, the interference between the probe and the workpiece can be prevented.

In the above, the touch-and-back mechanism may preferably stop driving the elevation driving mechanism when the probe is retracted to a measurement initiation position if the retraction amount is larger than a distance for the probe to touch the measurement surface of the workpiece from the measurement initiation position.

Accordingly, since the elevation driving mechanism is stopped when the probe is retracted to the measurement initiation position if the retraction amount is larger than a distance for the probe to touch the measurement surface of the workpiece from the measurement initiation position, the interference between the probe and the workpiece can be prevented in advance.

Alternatively, the touch-and-back mechanism may preferably actuate a brake mechanism before a retraction target position after retraction of the slider.

According to the above arrangement, since the brake is actuated before the retraction target position after the retraction of the slider, the slider can be stopped at an early stage and the interference between the probe and the workpiece can be prevented in advance.

BRIEF DESCRIPTION OF THE DRAWINGS

FIG. 2 is a block diagram of the aforesaid embodiment;

FIG. 5 is an illustration of lifting and lowering of a slider when retraction amount is larger than a distance for the probe to touch a measurement surface from a measurement initiation position together with an elapsed time.

DETAILED DESCRIPTION OF PREFERRED EMBODIMENT(S)

An embodiment of the present invention will be described below with reference to attached drawings.

Figure 1:
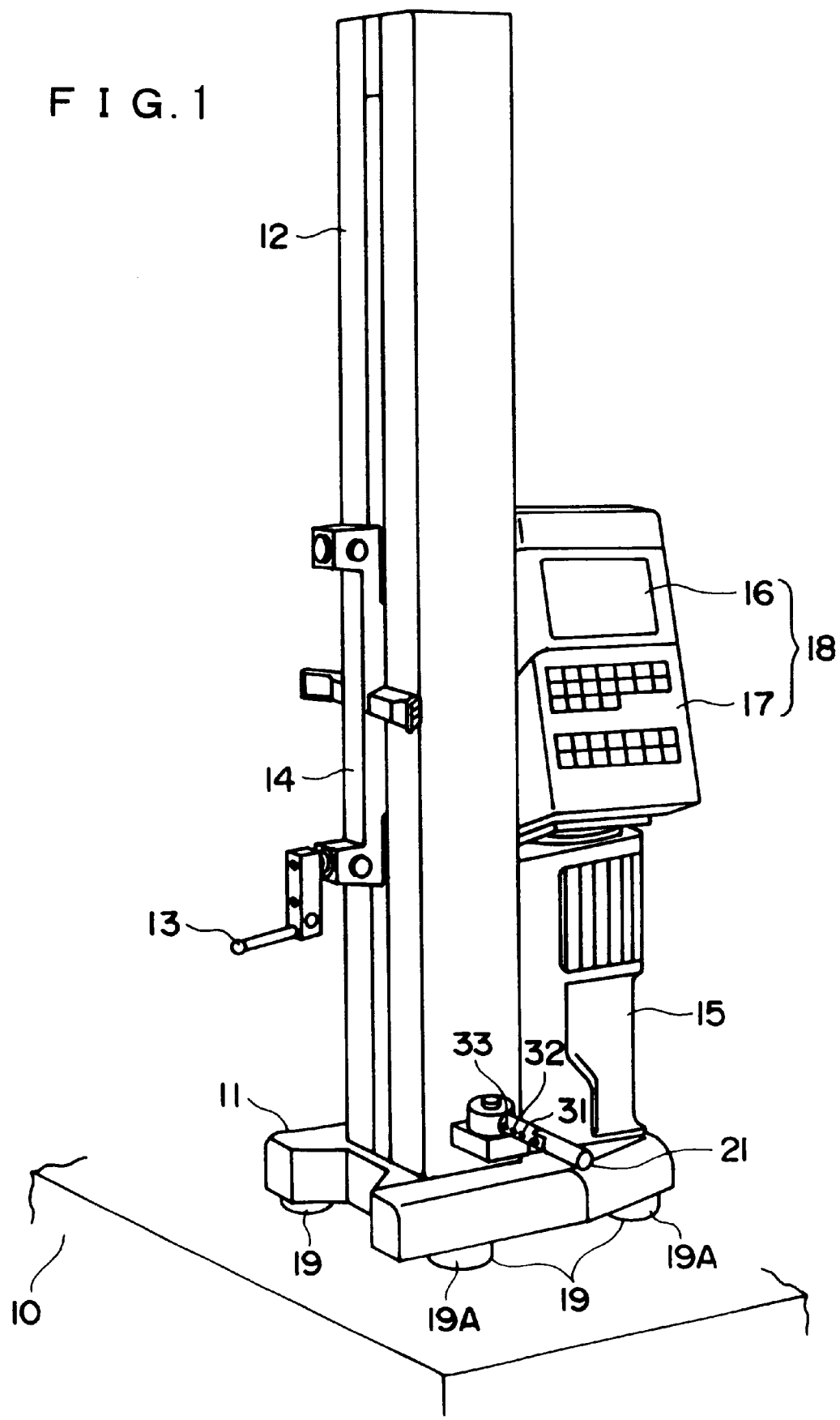
FIG. 1 is a perspective view showing an embodiment of the present invention.
Figure 3A:
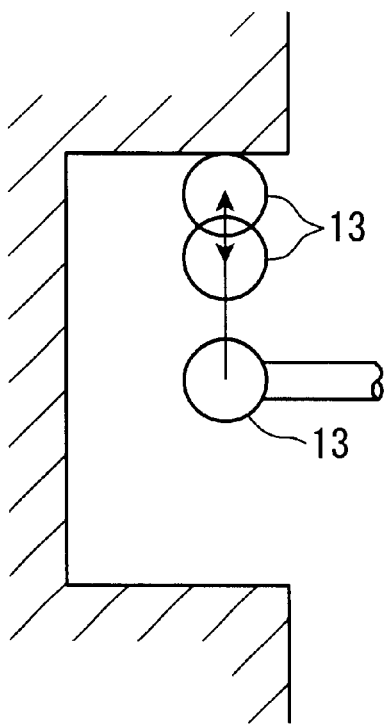
FIG. 3 is an illustration of a movement locus of a probe when an upper wall of a groove is measured.
Figure 3B:
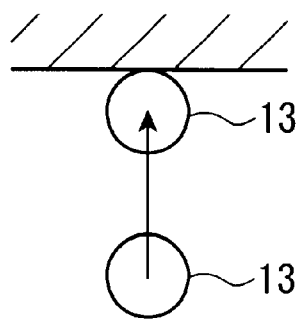
Figure 3C:
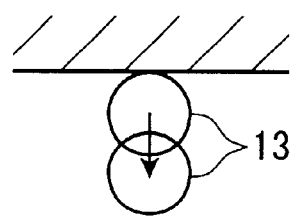

FIG. 1 is a perspective view of a height gauge as a linear measuring equipment of the present embodiment. As shown in the figure, the height gauge according to the present embodiment includes a base 11 movably disposed on a surface plate 10, a column 12 vertically disposed on the base 11, a slider 14 vertically elevatable along the column 12 and having a probe 13.

A grip portion 15 is provided to the base 11 opposite to the column 12, and a display console 18 is provided to an upside of the grip portion 15 that has a display 16 such as LCD and a key input portion 17 on a surface thereof.

An air-flotation mechanism 19 for blowing out air from the base 11 to the surface plate 10 to float the base 11 relative to the surface plate 10 is provided on a lower side of the base 11. The air-flotation mechanism 19 includes a plurality of air pads 19A provided to a lower side of the base 11 and having a number of air blowout holes, and a compressor for feeding air to the air pad 19A (though not shown, provided to a lower part of the grip portion 15).

A handle 21 projects from a right side of the column 12 (i.e. a side adjacent to a side having the probe 13) adjacent to the base 11 (i.e. lower position) orthogonally with the column 12. An air-floatation switch 31, a repeat switch 32 and a cancel switch 33 are sequentially provided to the handle 21. The air-floatation switch 31 controls supply and cut-off of the air toward the air-floatation mechanism 19. The repeat switch 32 repeatingly commands a measurement process in a previous measurement item. The cancel switch 33 commands cancellation of the measurement process now in progress.

FIG. 2 is a block diagram showing entire arrangement of the present invention. In the figure, a controller 41 has a CPU 42 as a controlling means and a memory 43. The memory 43 has a program storing portion 43A for storing various measurement step programs, and a measurement data storing portion for storing measurement data.

An elevation driving means 44 for vertically lifting and lowering the slider 14 and a displacement sensor 45 for detecting a height displacement of the slider 14 elevated by the elevation driving means 44 are connected to the CPU 42 as well as the key input portion 17, three switches 31, 32 and 33 provided to the handle 21, the display 16 and the air-floatation mechanism 19.

The CPU 42 executes respective steps in accordance with a measurement step program stored in the program storing portion 43A, drives the elevation driving mechanism 44 to lift and lower the slider 14 and includes a touch-and-back mechanism for driving and stopping the elevation driving mechanism 44 in a direction for the probe 13 to move away from the measurement surface of the workpiece after fetching the detection value of the displacement sensor 45 when the probe 13 touches the measurement surface of the workpiece.

The touch-and-back mechanism has a function to stop driving of the elevation driving mechanism 44 when the probe 13 is retracted to reach a predetermined allowable stop area relative to a retraction target position remote from the measurement surface of the workpiece by a predetermined retraction amount, and a function for forcibly stopping the slider 14 when the probe 13 keeps on retracting beyond the retraction target position and a predetermined time passes from the-time when the probe 13 is separated from the measurement surface of the workpiece.

The elevation driving means 44 includes a lifting motor 44A and a constant pressure mechanism 44B provided to an output shaft of the lifting motor 44A. The constant pressure mechanism 44B transmits the rotation of the lifting motor 44A to the slider 14 through a transmission mechanism such as a belt to lift and lower the slider 14 and includes a mechanism for idly running when a load exceeding a predetermined value is applied to the slider 14.

The displacement sensor 45 includes a scale having an optical grid vertically provided along the column 12 and a sensor disposed on the slider 14 opposite to the scale, both the scale and the sensor. cooperating to detect the height displacement amount of the slider 14 on the column 12 as an electric signal.

Next, an effect of the present invention will be described below.

In initiating measurement, the handle 21 is grasped with one hand and the air-floatation control switch 31 is pressed by a thumb of the hand. Then, the base 11 floats relative to the surface plate 10 by the air-floatation mechanism 19 and the base 11 is moved with the handle 21 being grasped to locate the probe 13 adjacent to a target portion of the workpiece while being floated. The hand is released from the air-floatation control switch 31 thereafter. Accordingly, since the air is cut off, the base 11 rests in contact with the surface plate 10.

When the measurement command is given, the CPU 42 drives the elevation driving mechanism 44 to lift or lower the slider 14 to let the probe 13 be in contact with the target portion of the workpiece.

For instance, when the height position of an upper wall of a groove is measured, the probe 13 is initially lifted and, when the contact of the probe 13 to the upper wall of the groove is detected, the detection value of the displacement sensor 45 is fetched. The detection value is displayed on the display 16, and the probe 13 is retracted (lowered) by a predetermined retraction amount after a predetermined time suspension.

Figure 4:
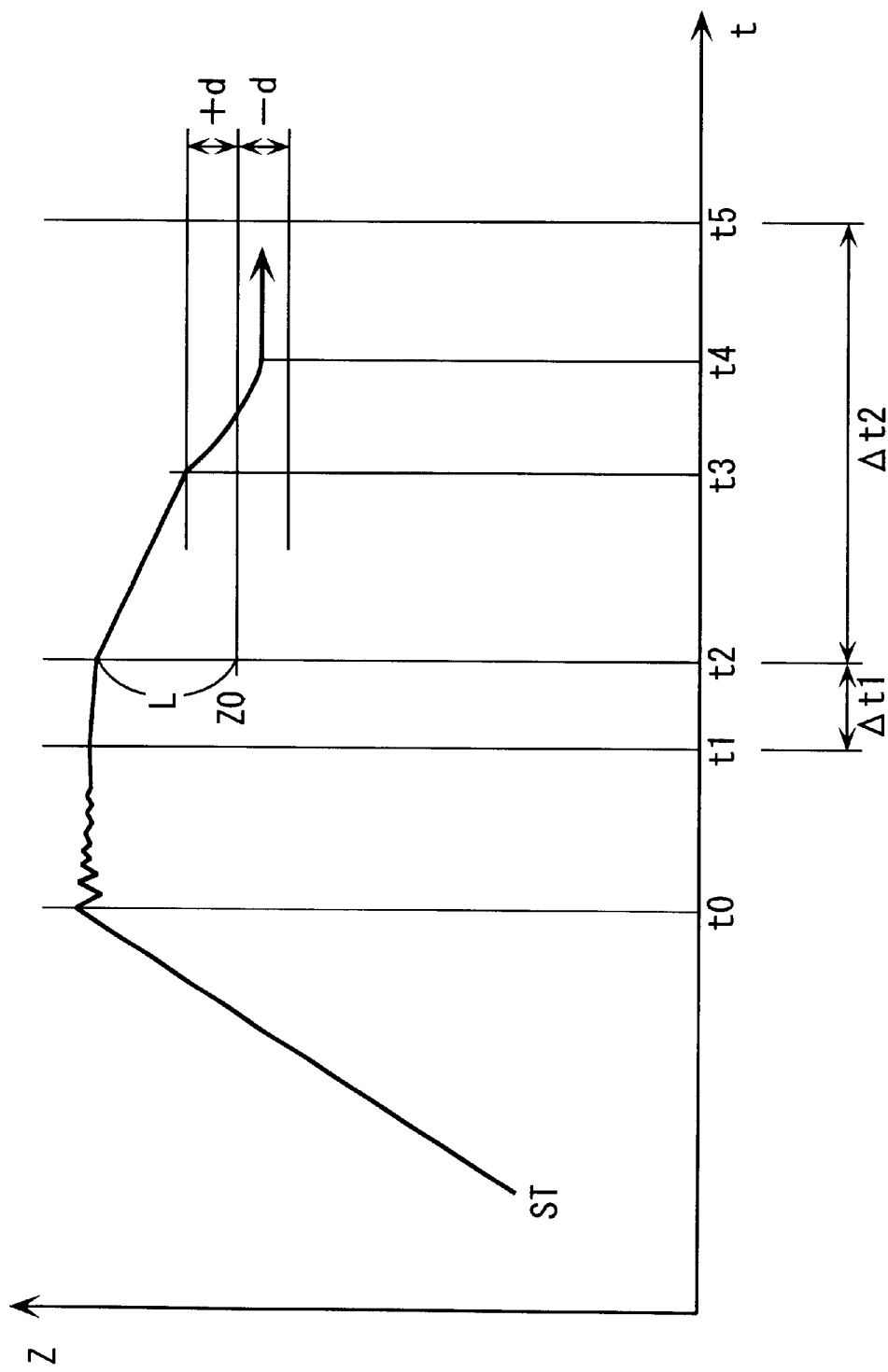
FIG. 4 is an illustration of lifting and lowering of a slider corresponding to the movement locus of the probe shown in FIG. 3 together with an elapsed time.

In other words, as shown in FIG. 4, the slider 14 is lifted from the measurement initiation position ST by driving the elevation driving mechanism 44. Then, when the probe 13 touches the upper wall at time (t0), the motor 44A runs idle by the constant pressure mechanism 44B. When fluctuation value of the height position Z is within a predetermined range (t), the value of the displacement sensor 45 is fetched to be displayed on the display 16 and the driving of the motor 44 is stopped.

After suspending the motor 44A for a predetermined time (Δt1), the motor 44 is reversely rotated to retract the slider 14. In other words, the slider 14 is lowered. When the slider 14 is retracted to reach a predetermined allowable stop area (Z0+d) relative to a retraction target position Z0 (which can be set from the key input portion 17 at will) remote from the measurement surface of the workpiece by a predetermined retraction amount L (t3), the driving of the motor 44A is stopped. Accordingly, the slider 14 stops after slightly retracting by inertia (t4). Therefore, since the probe 13 and the workpiece are separated at this time, the workpiece is not likely to be scarred or the probe 13 is not damaged even when the measuring machine and/or the workpiece are moved. Accordingly, the measurement efficiency can be improved without damaging the measuring machine and/or the workpiece.

When the slider keeps on retracting beyond the retraction target position Z0 by inertia after stopping the driving of the motor 44A, the slider 14 is forcibly stopped by actuating the brake mechanism 44C after a predetermined time (Δt2) passes (t5). Accordingly, even when the probe 13 keeps on retracting beyond the retraction target position Z0, since the slider 14 is forcibly stilled after the predetermined time (Δt2), the probe 13 and the workpiece are less likely to be interfered with each other.

According to the present embodiment, following effects can be obtained.

Since a touch-and-back mechanism for driving the elevation driving mechanism 44 to lift and lower the slider 14, for driving the elevation driving mechanism 44 to move the probe 13 in a direction away from the measurement surface of the workpiece and for stopping the slider is provided, the workpiece is not scarred or the probe 13 is not damaged even when the measuring machine and/or the workpiece is moved immediately after measurement. Accordingly, the workpiece and the probes are not damaged and measurement efficiency can be improved.

Since the touch-and-back mechanism stops the drive of the elevation driving mechanism 44 when the probe 13 is retracted to reach a predetermined allowable stop area (Z0+d) relative to the retraction target position Z0 remote from the measurement surface of the workpiece by the predetermined retraction amount L, the probe 13 is stilled adjacent to the retraction target position Z0 by inertia. In short, the probe 13 can be stilled at a position adjacent to the retraction target position Z0.

Since the touch-and-back mechanism forcibly stops the slider 14 when the probe 13 keeps on retracting beyond the retraction target position Z0 and when a predetermined time (Δt2) passes from the time (t2) when the probe 13 is separated from the measurement surface of the workpiece (t5), the probe 13 and the workpiece are less likely to interfere with each other when the probe 13 keeps on retracting beyond the retraction target position Z0.

Since the retraction target position Z0 can be set at will, the most appropriate retraction amount can be set in accordance with the target portion to be measured and the interference between the probe 13 and the workpiece can be prevented.

Incidentally, the touch-and-back mechanism may stop the elevation driving mechanism 44 when the probe 13 is retracted to the measurement initiation position ST if the retraction amount L is larger than the distance for the probe 13 to touch the measurement surface of the workpiece from the measurement initiation position ST.

More specifically, as shown in FIG. 5, when the retraction amount L is larger than the distance L1 for the probe 13 to touch the measurement surface of the workpiece from the measurement initiation position ST, the brake mechanism 44C may be driven to stop the elevation driving mechanism 44 when the probe 13 is retracted to the measurement initiation position ST.

Accordingly, since the elevation driving mechanism 44 is stopped when the probe 13 is retracted to the measurement initiation position ST if the retraction amount L is larger than the distance L1 for the probe 13 to touch the measurement surface of the workpiece from the measurement initiation position ST, interference between the probe 13 and the workpiece can be prevented in advance.

Further, the touch-and-back mechanism may actuate the brake mechanism 44C before the retraction target position Z0 after the slider 14 is retracted.

Accordingly, since the brake mechanism 44C works before the retraction target position Z0 after the slider 14 is retracted, the elevation driving mechanism 44 can be stopped at an early stage. Therefore, the interference between the probe 13 and the workpiece can be prevented in advance.

Though photoelectric displacement sensor is used in the above embodiment, electrostatic capacitance or magnetic displacement sensor can also be used.

What is claimed is:

1. A linear measuring machine, comprising: a base movably disposed on a surface plate; a column provided on the base; an elevation driving mechanism including a motor for lifting and lowering a slider having a probe; a displacement sensor for detecting a displacement of the slider in a height direction; a controller for fetching a detection value of the displacement sensor when the probe touches a measurement surface of a workpiece; and a display for displaying the detection value fetched by the controller, the controller including a touch-and-back mechanism for moving the probe in a direction away from the measurement surface of the workpiece after fetching the detection value of the displacement sensor when the probe touches the measurement surface of the workpiece and for stopping the slider, when the slider is lifted or lowered by driving the elevation driving mechanism, wherein the touch-and-back mechanism forcibly stops the slider when the probe keeps on retracting beyond the retraction target position and when a predetermined time passes after the probe is separated from the measurement surface of the workpiece.

2. The linear measuring machine according to claim 1, wherein a distance the probe retracts can be set at will.

3. The linear measuring machine according to claim 1, wherein the touch-and-back mechanism stops driving the elevation driving mechanism when the probe is retracted to a measurement initiation position if a distance the probe retracts is larger than a distance for the probe to touch the measurement surface of the workpiece from a measurement initiation position.

* * * * *